United States Patent [19]
Haraguchi

[11] Patent Number: 5,355,252
[45] Date of Patent: Oct. 11, 1994

[54] SCANNING LASER MICROSCOPE

[75] Inventor: Koshi Haraguchi, Tokyo, Japan

[73] Assignee: Jeol Ltd., Tokyo, Japan

[21] Appl. No.: 9,286

[22] Filed: Jan. 26, 1993

[30] Foreign Application Priority Data

Jan. 27, 1992 [JP] Japan ................... 4-011933

[51] Int. Cl.⁵ ............................................. G02B 21/36
[52] U.S. Cl. .................... 359/369; 359/305; 359/368; 250/201.3
[58] Field of Search ........................ 359/368–369, 359/202, 305, 196–197; 250/201.3

[56] References Cited

U.S. PATENT DOCUMENTS

| | | | |
|---|---|---|---|
| 3,869,197 | 3/1975 | Owens et al. | 359/311 |
| 5,035,476 | 7/1991 | Ellis et al. | 359/368 |
| 5,122,648 | 6/1992 | Cohen et al. | 250/201.3 |

OTHER PUBLICATIONS

C. J. R. Sheppard et al., "Image formation in confocal scanning microscope", Optik 55, No. 4 (1980) PP. 331-342.
C. J. R. Sheppard et al., "Image formation in the scanning microscope", Optica Acta, (1977), vol. 24, No. 10, 1051-1073.
I. J. Cox and C. J. R. Sheppard, "Scanning optical microscope incorporating a digital framestore and microcomputer", Applied Optics, vol. 22, No. 10, (1983), pp. 1474-1478.

*Primary Examiner*—Scott J. Sugarman
*Assistant Examiner*—James Phan
*Attorney, Agent, or Firm*—Webb Ziesenheim Bruening Logsdon Orkin & Hanson

[57] ABSTRACT

A scanning laser microscope capable of detecting a fine structure producing low contrast and easily measuring the length, the volume, and so forth of an object. A laser beam is focused onto the object. The beam is scanned at regular intervals, or in a digital fashion, in two dimensions. Light scattered from the object is detected by a detector to observe an image of the object. The output signal from the detector is digitized into a given number of gray levels in synchronism with the digital scans. The object image can be stored in a memory and processed while correlating the scanned position with the intensity of the scattered light at this position.

1 Claim, 4 Drawing Sheets

DISTANCE FROM THE CENTER
OF THE DIFFRACTION IMAGE

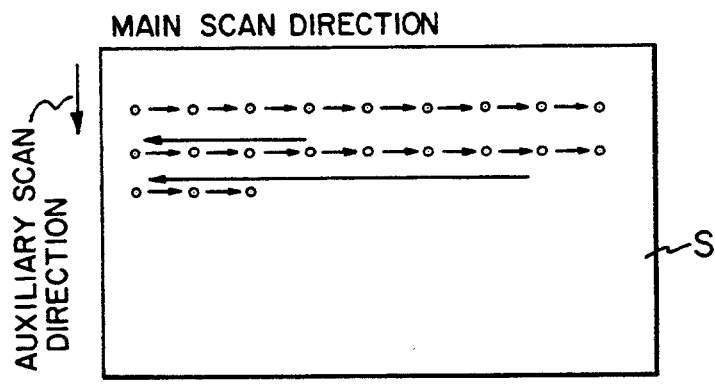
FIG. 8
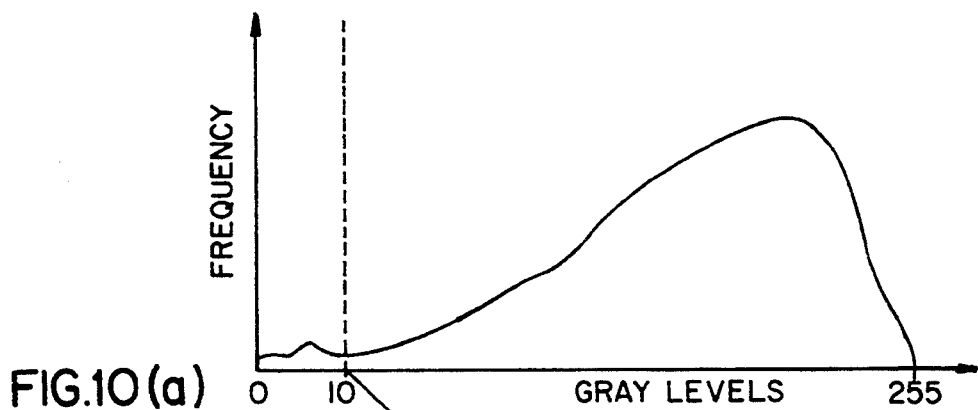
FIG. 11
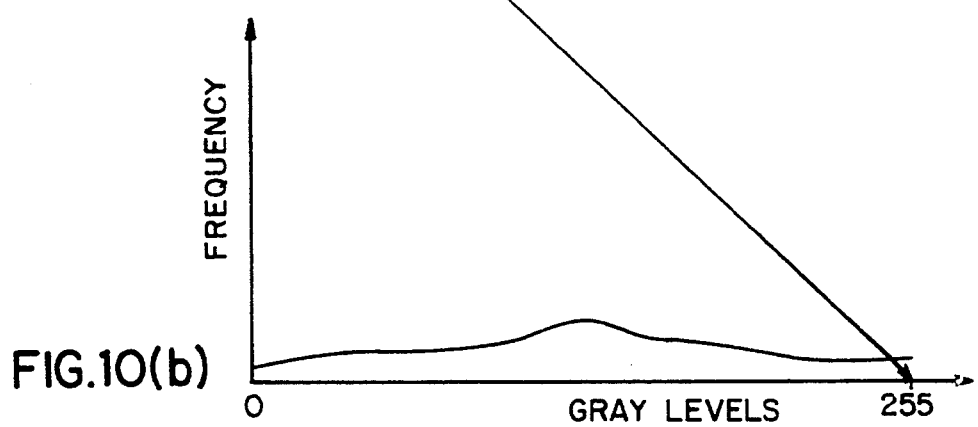
FIG.10(a)
FIG.10(b)

SCANNING LASER MICROSCOPE

FIELD OF THE INVENTION

The present invention relates to a scanning laser microscope and, more particularly, to a scanning laser microscope capable of detecting fine structures of low contrast, easily correlating the position illuminated by a laser beam with information obtained from this position, and easily measuring the length, the volume, or the like of an object.

BACKGROUND OF THE INVENTION

A scanning laser microscope is a kind of photoelectric microscope which focuses a light beam emanating from a laser onto a point on an object of interest, receives the light scattered from the point by a photoelectric converter, and obtains a signal indicating the condition of the point. Some scanning laser microscopes can collect information regarding the surface of an object by varying the distance between the object and the focused laser beam. Scanning laser microscopes are expected to find wider application.

The features of a scanning laser microscope are now described briefly. The optical path in the prior art microscope is schematically shown in FIG. 1. In this microscope, the illuminating light emitted from a light source 30 such as a tungsten lamp passes through a condenser lens 32 and illuminates the whole field of view of a sample 34. An image of the illuminated sample is focused onto an image plane 38 by an objective lens 36. It is assumed that the sample does not transmit light and that the sample is provided with an infinitely small hole on the optical axis. Light going out of this hole is focused onto the image plane by the objective lens. If no diffraction occurs, an infinitely small light spot should be produced. In practice, however, the light spot has some size because the light behaves as waves. This is graphically shown in FIG. 2, which represents the distribution of intensities of Fraunhofer diffraction light due to a circular opening. As can be seen from FIG. 2, the center ($x=0$) of the diffraction image relative to the geometrical image is brightest. Completely no light exists at the position $x=3.832$ (the unit is normalized with the radius of the opening, the wavelength, or other factor). From this position on, dark portions and bright portions alternate with each other but the intensities are quite small. Therefore, these portions present almost no problem. Let us now consider a disk having a radius $x=3.832$. This is defined as the size of the diffracted image created by the stigmatic optical system. This is called an Airy disk and determines the limit of resolution. Light corresponding to 16.2% of the whole light intensity exists outside the Airy disk. This is called halo. Normally, the halo poses no problems. However, when a dark image located beside a bright spot is observed, the halo cannot be neglected.

A method contemplated to remove the halo is illustrated in FIG. 3, where a pinhole 40 is located on the side of the diffracted image. This method permits one to improve the resolution without suffering from a deterioration in the contrast.

However, the adoption of this method means giving up a two-dimensional image. Therefore, "scan" is needed to obtain a two-dimensional image. Hence, a scanning microscope is necessary. Three types of scanning microscopes exist, and they are termed the type 1a, the type 1b, and the type 2, respectively, after Doctor Sheppard of Oxford University who is a forerunner of this research. The optical paths of these three types are schematically shown in FIGS. 4, 5, and 6, respectively. Of these three types, the types 1a and 1b scan 44 the light source or the detector 42. These two types have a single condenser lens and so the diffraction function on the sample surface is the same as the diffraction function of FIG. 2.

On the other hand, a scanning microscope of the type 2 scans both light source and detector This type has two condenser lenses. In this microscope, light is detected, based on a function (or convolution) that is a square of the diffraction function shown in FIG. 2. The halo is removed by a pinhole. Therefore, this kind of microscope is called a confocal scanning microscope. The aforementioned convolution function takes the form indicted by the solid line in FIG. 7 whereas a normal optical microscope takes the form indicated by the dotted line. As can be seen from the graph of FIG. 7, the confocal scanning microscope has a smaller Airy disk and a higher resolution.

The most important factor of the confocal scanning microscope is the pinhole installed to remove the halo. This pinhole is helpful in improving the resolution. The pinhole plays another great role. This is now described by referring to FIG. 8. Light rays coming from surfaces located off the focus cannot pass through the pinhole. Consequently, the pinhole acts to remove unwanted scattering light, or flare, produced by the objective lens and to make the depth of focus shallower. A shallower depth of focus improves the contrast and permits observation of a three-dimensional image. For these reasons, this microscope enables one to observe an image which cannot be seen by a normal optical microscope.

In this way, the scanning laser microscope has a higher resolution, higher contrast, and shallower depth of focus than the prior art optical microscope. For example, when an object such as a semiconductor device is observed, its fine structures have low contrast. Therefore, if the output signal from the detector is processed directly as an analog signal and visualized as in the prior art techniques, then it is impossible to make full use of the high resolution. Also, if the laser beam is scanned continuously, or in an analog fashion, then it is difficult to locate the illuminated position. Another problem is that it is difficult to correlate the illuminated position with information obtained from this position.

SUMMARY OF THE INVENTION

It is an object of the present invention to provide a scanning laser microscope which digitally scans an illuminating laser beam in two dimensions, can detect fine structures of low contrast by converting the image signal from a detector into digital form in synchronism with the digital scan, and can measure the length, the volume, and so forth of an object.

This object is achieved in accordance with the teachings of the invention by a scanning laser microscope which focuses a laser beam onto an object while scanning the beam in two dimensions and detecting light scattered from the object to observe an image of the object. This microscope is characterized in that the focused laser beam is made to scan the object at regular intervals digitally in each direction of scan and that the image signal from the detector is digitized and represented in terms of a given number of gray levels in synchronism with the digital scan.

In the novel scanning laser microscope, the illuminating laser beam is scanned in two dimensions at regular intervals, or in a digital fashion. The detected image signal is digitized so as to be represented in terms of a given number of gray levels in synchronism with the digital scan. Therefore, the image signal can be stored and processed as an image signal while correlating the scanned position with the intensity of light scattered from this position. For example, only those gray levels which produce low contrast but contain information about a fine structure are extracted. Then, a gradation conversion is performed in such a way that these gray levels are distributed from black to white. This permits observation of a fine structure which would have been impossible to achieve by an ordinary optical microscope or by the prior art scanning laser microscope that detects and displays the intensity of scattered light in an analog manner. Moreover, it is easy to vary the field of view and to correlate the illuminated position with information obtained from this position. Consequently, the length, the volume, and other factors of an object can be measured with greater ease. Also, image-processing techniques can be readily applied to the obtained morphological information.

Other objects and features of the invention will appear in the course of the description thereof which follows.

BRIEF DESCRIPTION OF THE DRAWINGS

FIG. 8 is a diagram illustrating the action of a pinhole in a confocal scanning microscope;

FIGS. 10($a$) and 10($b$) are graphs illustrating gradation conversion processing according to the invention; and FIG. 11 is a diagram illustrating the manner in which a light beam moves on an object S.

DETAILED DESCRIPTION OF THE INVENTION

Figure 1:
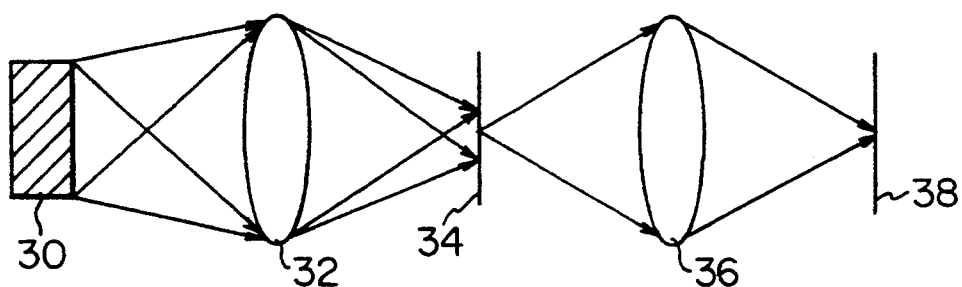
FIG. 1 is a schematic optical path diagram of the prior art microscope.
Figure 2:
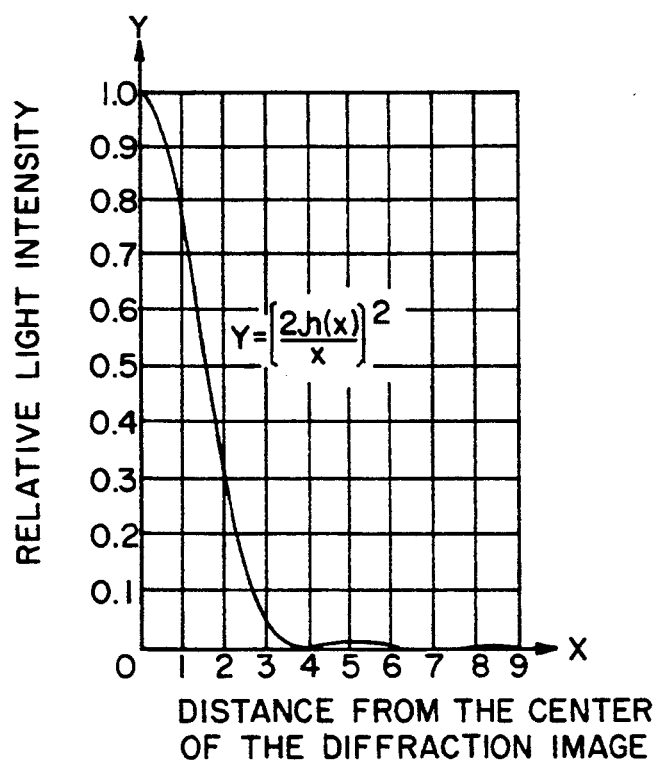
FIG. 2 is a graph showing the intensity distribution of Fraunhofer diffraction light due to a circular opening.
Figure 3:
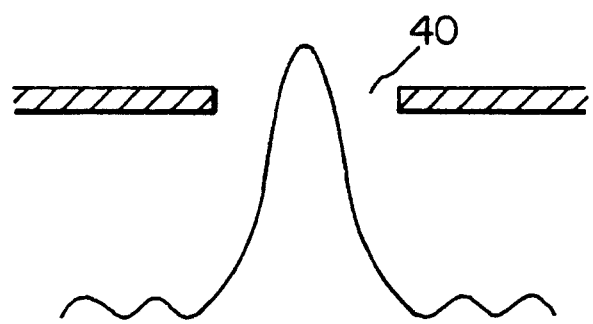
FIG. 3 is a diagram illustrating a method of removing halo by the use of a pinhole.
Figure 4:
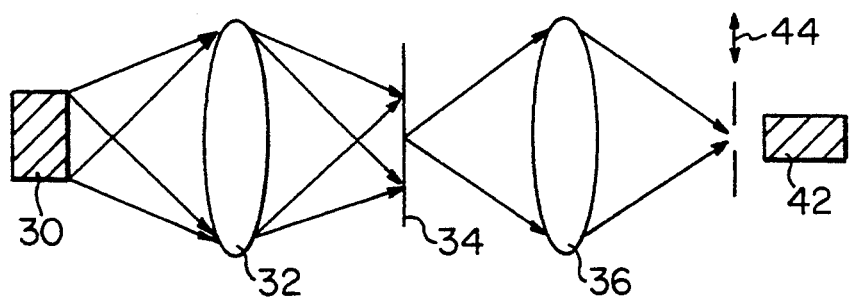
FIG. 4 is a schematic optical path diagram of a first type scanning microscope.
Figure 5:
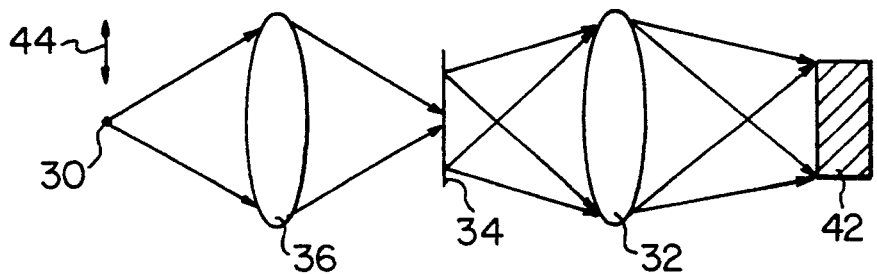
FIG. 5 is a schematic optical path diagram of a second type scanning microscope.
Figure 6:
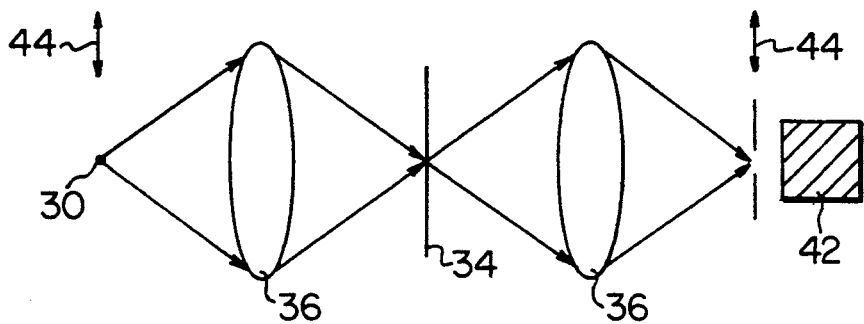
FIG. 6 is a schematic optical path diagram of a confocal scanning microscope.
Figure 7:
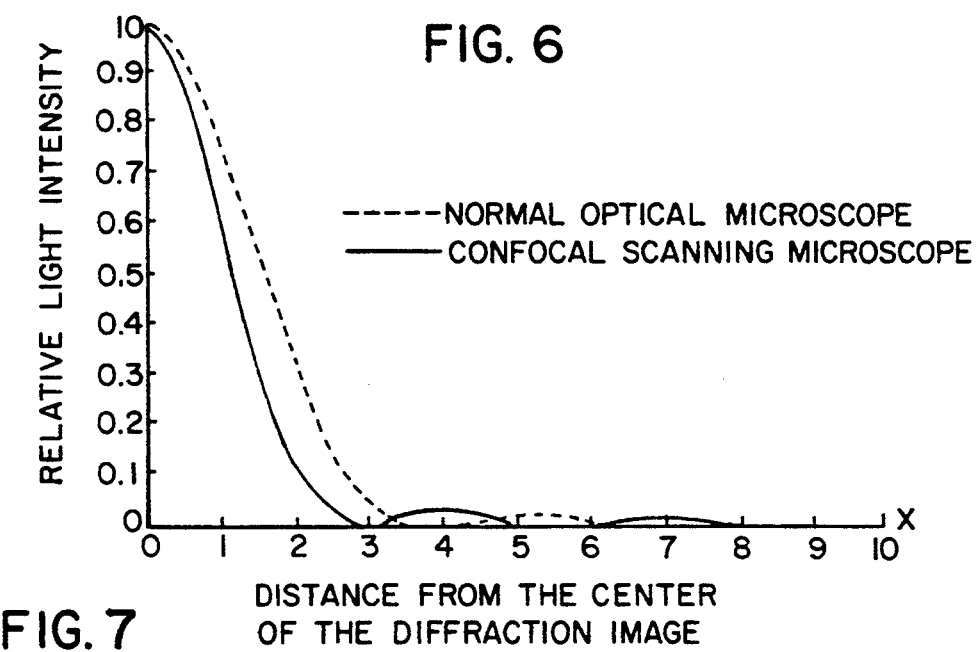
FIG. 7 is a graph showing the intensity distribution of diffracted light due to a circular opening in the case of a confocal type.
Figure 9:
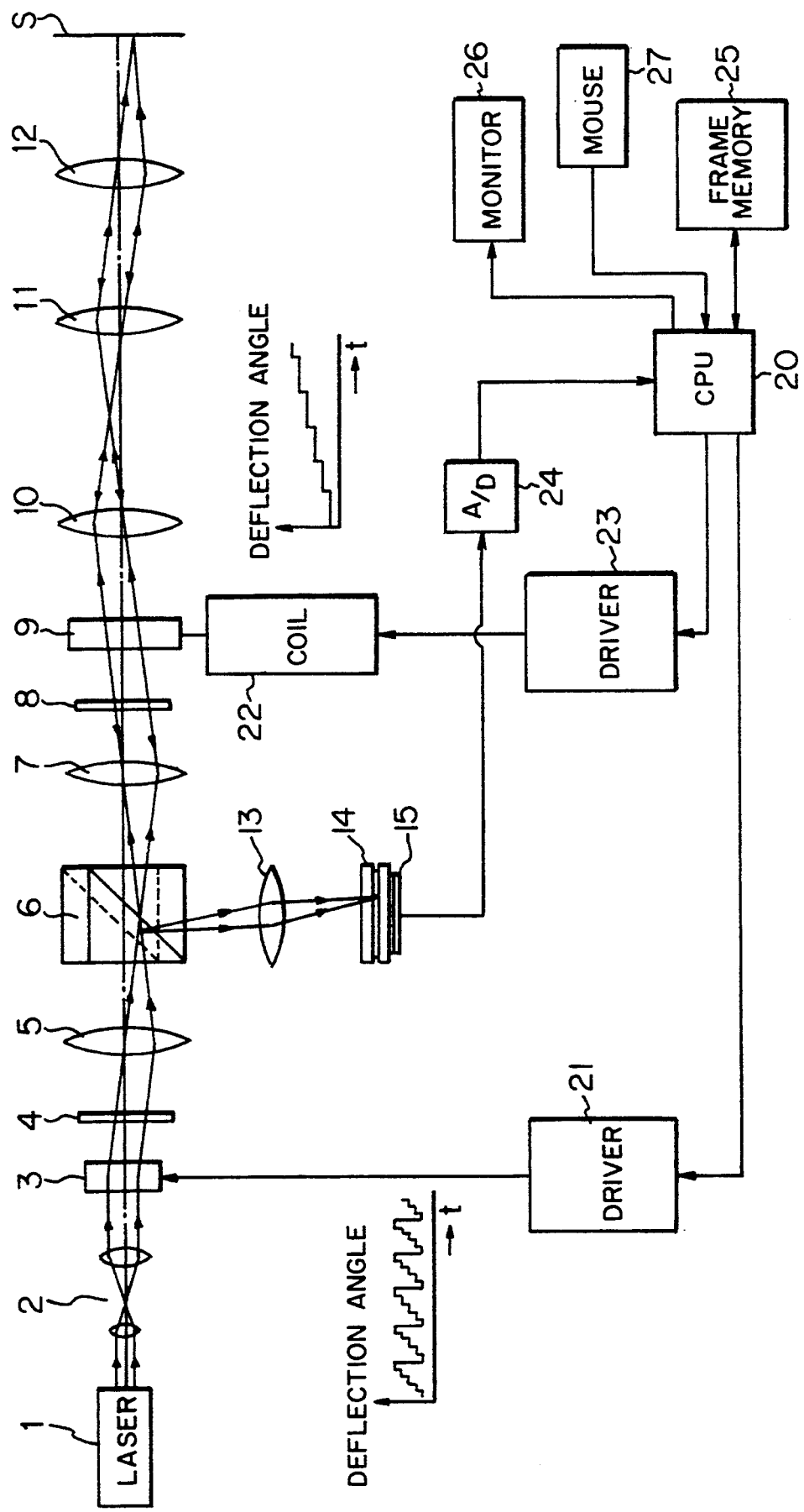
FIG. 9 is a block diagram of a scanning laser microscope according to the invention, the microscope including an optical system.

Referring to FIG. 9, there is shown a scanning laser microscope according to the invention, the microscope including an optical system. This optical system comprises a laser 1 emitting a laser beam and a beam expander 2 that collimates the laser beam and increases the diameter of this beam. An anisotropic Bragg diffraction acoustooptic deflector 3 which is a first optical deflector is disposed behind the expander 2. This deflector 3 deflects the outgoing light at a high speed in a direction within the plane of the sheet. This is hereinafter referred to as the main scan. A quarter-wave plate 4 which converts the elliptically polarized light from the deflector 3 into linearly polarized light is positioned behind the deflector 3. With respect to the light going out of the deflector 3, the state of the elliptical polarization varies slightly according to the deflection angle. Therefore, as an example, the quarter-wave plate 4 is so orientated that it converts the elliptically polarized light into linearly polarized light at the center of the range of the deflection angle and that most of the polarized component is concentrated in the direction of the linearly polarized light at both ends of the range of the deflection angle. A first positive lens 5 is disposed behind the deflector 3 in such a way that the plane of polarization agrees with the front focus of the lens 5. A polarization beam splitter 6 that discriminates between the laser beam from the laser 1 and the scattered light from an object S is disposed behind the lens 5. Since the orientation of the beam division and combination plane of the beam splitter 6 is adjusted around the optical axis in such a manner that the linearly polarized light produced by the quarter-wave plate 4 passes through the splitter 6, it is not always necessary that the beam division and combination plane be perpendicular to the sheet of the drawing. A second positive lens 7 is disposed behind the beam splitter 6 in a confocal relation to the first positive lens 5. The first lens 5 and the second lens 7 together form a telecentric relay lens system. A galvano mirror 9 that is a second light deflector is located at the rear focus of the second positive lens 7 and deflects the incident light beam in a direction within the plane of the sheet. This is hereinafter referred to as the auxiliary scan. Another quarter-wave plate 8 which converts the linearly polarized light going out of the beam splitter 6 into circularly polarized light and converts the circularly polarized light returning from the object S into linearly polarized light perpendicular to the direction of the linear polarization is disposed between the second positive lens 7 and the galvano mirror 9. The position of the quarter-wave plate 8 is not limited to this position. This plate 8 may be placed anywhere between the beam splitter 6 and the object S. The light beams from the galvano mirror 9 which are polarized in the plane of the sheet of the drawing and in a direction perpendicular to the plane, respectively, are directed to an objective lens 12 via a third positive lens 10 and via a fourth positive lens 11. These confocal lenses 10 and 11 together form a second telecentric relay lens system. The third lens 10 and the fourth lens 11 are so arranged that the front focus of the third lens 10 is in agreement with the axis of rotation of the galvano mirror 9 and that the rear focus of the fourth lens 11 coincides with the entrance pupil of the objective lens 12. A condenser lens 13 is disposed in such a way that the scattered light which comes from the object S and is reflected from the beam division and combination plane of the beam splitter 6 is focused. A slit 14 whose longitudinal direction is in the direction of the main scan is disposed at the focused position in a confocal relation to the focused light on the object S. A detector 15 for detecting the light passed through the slit 14 is disposed behind the slit 14. As an example, a single photomultiplier is used as the detector 15. This photomultiplier has a sufficient photosensitive incident surface so that light passing across any portion of the slit enters the photomultiplier and is detected.

In this arrangement of the optical system, the light beam emitted by the laser i is converted into a collimated light beam of an increased diameter by the beam expander 2. Then, the beam is deflected through an angle according to the wavelength of the applied ultrasonic waves in the direction of the main scan, or within the plane of the sheet, by the acoustooptic deflector 3. This deflected light beam which is elliptically polarized light is converted into linearly polarized light in a given direction or into elliptically polarized light approximating the linearly polarized light by the quarter-wave plate 4. This collimated light beam is focused by the first positive lens 5 and enters the polarization beam splitter 6. Since the state of polarization is changed by the quarter-wave plate 4 in such a way that the incident light almost completely passes through the beam division and combination plane of the splitter, the beam passes through the beam splitter 6 with almost no attenuation. Then, the beam is converted into a collimated light beam by the second positive lens 7. This linearly polarized light beam enters another quarter-wave plate 8 and is converted into circularly polarized light. This circularly polarized light is deflected in the direction of the auxiliary scan, or perpendicularly to the plane of the sheet, by the galvano mirror 9 which is disposed in a confocal relation to the anisotropic Bragg diffraction acoustooptic deflector 3. In this way, the beam is deflected in two dimensions, or in the direction of the main scan and in the direction of the auxiliary scan, and is caused to enter the entrance pupil of the objective lens 12 by the third positive lens 10 and the fourth positive lens 11 which form the second telecentric relay lens system. Since this entrance pupil has a confocal relationship to both deflector 3 and galvano mirror 9, the light beam incident on the entrance pupil arrives at a fixed position not affected by the deflection angle. This light beam is focused onto the object S by the objective lens 12 as a focused point that scans the object in two dimensions. The scattered light containing the information about the focused point on the object S follows the optical path described above in the reverse direction up to the beam splitter 6. The light is converted by the quarter-wave plate 8 into linearly polarized light perpendicular to the light beam passed through the splitter 6. Therefore, the scattered light from this object S is reflected from the beam division and combination plane of the splitter 6, enters the condenser lens 13, and is focused onto the slit 14. Finally, the intensity is photoelectrically detected by the detector 15. Since this returning light beam passes only one light deflector (i.e., the galvano mirror 9), the focused point moves in the direction of the main scan. Consequently, the light spot is detected while its side lobes, or halo, in the direction of the auxiliary scan are removed by the slit 14 located in a confocal relation to the object S lying before the photosensitive plane of the detector 15, the longitudinal direction of the slit lying in the direction of the main scan.

For example, an off <110> type anisotropic Bragg diffraction acoustooptic deflector is fabricated from a single crystal of tellurium dioxide. Traverse ultrasonic waves are propagated at an angle to the <110> axis of the deflector, which deflects the laser beam by the acoustooptical effect. Since the deflection angle is large, a scanning laser microscope having practically sufficient scanning range and scanning speed can be realized. However, the linearly polarized light is converted into elliptically polarized light. Therefore, if the quarter-wave plate 4 is not placed behind the deflector 3, a major portion of the light emerging from the deflector 3 is reflected by the beam division and combination plane of the beam splitter 6, and hence does not reach the sample S. The amount of light detected by the detector 15 is reduced greatly. As a result, the observed image is quite dark. As described above, the elliptically polarized light emerging from the deflector 3 is converted into linearly polarized light and so passes through the splitter 6 with almost no attenuation and reaches the sample S. Since the scattered light is detected by the detector 15, the amount of detected light increases greatly. As a result, the observed light is bright.

It is to be understood that the optical system described above is merely exemplary and that various known optical systems can be employed. For instance, the beam splitter may be positioned on the incident side of the first light deflector, and a pinhole may be used instead of the slit. Furthermore, a transmission type may be used instead of a reflection type.

The manner in which the light deflectors are activated and the processing of the output signal from the detector are next described. Although it is effective to vary the deflection angles in synchronism continuously in an analog manner by the deflector 3 and the galvano mirror 9 and to obtain a surface image of the object S by raster-scanning the focused point, it is difficult to locate the illuminated position. Also, it is difficult to correlate the illuminated position with the information obtained from this position. Accordingly, in the present invention, the deflection angles due to the light deflectors 3 and 9 are synchronously varied in given steps. In synchronism with this, the output signal from the detector 15 is converted into digital form. Specifically, a driver 21 for the deflector 3 and a driver 23 for a coil 22 driving the galvano mirror 9 are controlled by a CPU 20. The deflector 3 is controlled in such a way that the beam is deflected in given angular steps, i.e., discretely, in the direction of the main scan on the screen. The variations in the deflection angle are shown in FIG. 9. The galvano mirror 9 is so controlled that whenever the deflector 3 makes one scan across the screen in the direction of the main scan, the deflection angle is increased by a given angular increment in the direction of the auxiliary scan as shown in FIG. 9.

The movement of the light beam on the object S is shown in Fig. 11. The light beam, represented by a black spot, is scanned at regular intervals on the object S. The output signal from the detector 15 is converted into a given number of gray levels, e.g., 256 gray levels (i.e., 8 bits), by an A/D converter 24 in synchronism with the digital scans of the deflector 3 and of the galvano mirror 9. The output signal from the A/D converter is supplied via the CPU 20 to a frame memory 25, where it is stored at an address corresponding to the position of each pixel. A TV monitor 26 and a mouse 27 are connected with the CPU 20. Digitized object image stored in the frame memory 25, a histogram representing a gradation distribution, processed morphological image, or other information is displayed on the TV monitor 26. Also, various kinds of input are permitted.

As described above, in the novel scanning laser microscope, the illumination of the laser beam to the object S and the detection of the scattered light are performed not at continuous positions but at discrete positions in two dimensions. Therefore, it is easy to locate the illuminated position. At the same time, the intensity of the scattered light is digitized and represented in terms of a given number of gray levels in synchronism with the two-dimensional digital scan. In consequence, an image of the object can be stored in the frame memory 25 while correlating the illuminated position with the intensity of the scattered light at that position. Hence, the novel scanning laser microscope has numerous advantages over the prior art microscope where the intensity of scattered light is directly detected as an analog image signal and displayed as it is. Examples of the advantages are described briefly below.

As shown in FIG. 10(a), a histogram representing the gray levels stored in the frame memory 25 is found and displayed on the TV monitor 26. Gray levels 0-10 which reflect a fine structure but are substantially uniform in normal gray level division method are extracted. These extracted gray levels are converted into complete gray levels 0-255 and displayed as shown in FIG. 10(b). In this way, the fine structure which yields so low contrast that it cannot be observed by the ordinary optical microscope or by the prior art scanning laser microscope detecting the intensity of scattered light in an analog manner can be detected. Various other image processing techniques can be easily applied. For example, a special color may be given to a region-of-interest (ROI). Also, a region-of--interest which the operator wants to eliminate may be saturated with white or black color.

Furthermore, the field of view observed can be changed at will, and the illuminated position can be easily correlated with the information obtained from this position by specifying the address at which data is read from the frame memory 25, as well as the address of the illuminated position. Consequently, the length, the volume, and so forth of the object S can be easily measured. Additionally, the noise contained in the morphological image stored in the frame memory 25 can be suppressed by subsequently passing the image signal through a digital filter such as a median filter or boxcar filter. In this manner, portions producing especially low contrast can be observed with greater accuracy.

Further, in the novel scanning laser microscope, one quarter-wave plate is mounted between the anisotropic Bragg diffraction acoustooptic deflector and the deflection beam splitter. This quarter-wave plate converts the elliptically polarized light emerging from the acoustooptic deflector into linearly polarized light which passes through the beam splitter with almost no attenuation and reaches the sample. The scattered light is detected by the detector. Consequently, the amount of light detected increases greatly. As a result, the observed image is bright.

A morphological image of the sample can be derived by the use of the anisotropic Bragg diffraction acoustooptic deflector. The confocal relation can be improved by using a slit in front of the detector. Therefore, the sample can be optically sliced very accurately. Moreover, the depth of focus is shallow, because a laser beam is focused on the sample. An image of any arbitrary layer of the sample can be obtained. While some embodiments of the invention have been described, it is to be under stood that the invention is not limited to them but rather they can be modified variously.

Having thus described my invention with the detail and particularity required by the Patent Laws, what is described and claimed to be protected by Letters Patent is set forth in the following claims.

What is claimed is:

1. A scanning laser microscope for focusing a laser beam onto an object while scanning the beam in two dimensions and for detecting light scattered from the object to observe an image of the object, said microscope comprising:

a laser emitting a laser beam;

means for focusing the laser beam;

scanning means for deflecting the laser beam to scan the object at regular intervals in two dimensions with the focused laser beam, said scanning means comprising at least one anisotropic Bragg diffraction acoustooptic deflector;

a detector producing an image signal in response to the light scattered from the object;

a digitizing means which digitizes the image signal from the detector in synchronism with the digital scan in such a way that the image signal is represented in terms of a given number of gray levels;

means for manipulating the image signal to extract information about a fine structure by performing a gradation conversion distributing gray levels from black to white; and means for displaying the manipulated image signal.

* * * * *